(12) United States Patent
Lima

(10) Patent No.: US 7,592,558 B2
(45) Date of Patent: Sep. 22, 2009

(54) APPARATUS HAVING IMPROVED WEAR-RESISTANT PROPERTIES

(75) Inventor: Avelino F. Lima, North Hills, WV (US)

(73) Assignee: E.I. Du Pont De Nemours and Company, Wilmington, DE (US)

( * ) Notice: Subject to any disclaimer, the term of this patent is extended or adjusted under 35 U.S.C. 154(b) by 370 days.

(21) Appl. No.: 11/715,836

(22) Filed: Mar. 8, 2007

(65) Prior Publication Data

US 2007/0209922 A1 Sep. 13, 2007

Related U.S. Application Data

(60) Provisional application No. 60/781,433, filed on Mar. 10, 2006.

(51) Int. Cl.
*H01H 9/00* (2006.01)

(52) U.S. Cl. ..................................... 200/292; 200/16 A

(58) Field of Classification Search ...... 200/16 R–16 D, 200/547, 549, 550, 252, 292; 252/512–514; 174/250, 255, 256, 258
See application file for complete search history.

(56) References Cited

U.S. PATENT DOCUMENTS

| 4,366,516 | A | * | 12/1982 | Ogata et al. | 360/84 |
|---|---|---|---|---|---|
| 5,283,542 | A | * | 2/1994 | Ochiai et al. | 335/6 |
| 5,969,313 | A | | 10/1999 | Ikeshima et al. | |
| 5,990,440 | A | * | 11/1999 | Yamaguchi et al. | 218/158 |
| 6,046,258 | A | * | 4/2000 | Katsube et al. | 523/513 |
| 6,414,067 | B2 | * | 7/2002 | Katsube et al. | 524/436 |
| 6,828,366 | B2 | * | 12/2004 | Seidel et al. | 524/127 |
| 6,953,461 | B2 | * | 10/2005 | McClurken et al. | 606/51 |
| 7,009,029 | B2 | * | 3/2006 | Oka et al. | 528/310 |
| 7,029,604 | B2 | * | 4/2006 | Matsumora et al. | 252/514 |
| 7,396,428 | B2 | * | 7/2008 | Matsushima et al. | 156/272.8 |
| 2003/0060552 | A1 | | 3/2003 | Balfour et al. | |

FOREIGN PATENT DOCUMENTS

EP 0 511 848 A2 11/1992

* cited by examiner

*Primary Examiner*—Michael A Friedhofer

(57) ABSTRACT

An apparatus in which an electrically conductive contact is in slidable contact with a polymeric composition comprising thermoplastic polymer, a fibrous reinforcing agent, and a mineral filler. The Mohs hardness of the electrically conductive contact is within 1 unit of the Mohs hardness of the mineral filler.

15 Claims, 2 Drawing Sheets

APPARATUS HAVING IMPROVED WEAR-RESISTANT PROPERTIES

CROSS REFERENCE TO RELATED APPLICATIONS

This application claims the benefit of priority to U.S. Provisional Application No. 60/781,433, filed Mar. 10, 2006.

FIELD OF THE INVENTION

The present invention relates to an apparatus in which an electrically conductive contact is in slidable contact with a polymeric composition comprising thermoplastic polymer, a fibrous reinforcing agent, and a mineral filler.

BACKGROUND OF THE INVENTION

Many devices used in diverse applications, including electrical components, require that an electrically conductive (such as a metal, metal-plated, or carbon) contact be slid across a surface comprising polymeric and regions formed from metals or other electrically conductive materials. An example of such a component is an electrical switch in which one or more contacts are moved from position to position during operation. In some positions, a contact may be contacting a metal (or other electrically conductive) surface and in others the same contact may be contacting a polymeric surface that may be a part of the switch housing. The electrically conductive materials used for such contacts may be relatively soft. In such cases, the act of sliding the contact across the polymeric surface may abrade the surface of the contact, especially when the polymeric material contains mineral fillers and/or fibrous reinforcing agents. The electrically conductive particles abraded from the electrically conductive contact can become embedded in the plastic, thus reducing the operability of the device (by, for example, creating an undesired conductive path between the electrically conductive regions of the surface). Furthermore, the contact could be worn down to a point where the device no longer operates reliably. This can be particularly problematic when the electrically conductive contact is a thin metal plated surface.

Since it is often necessary or desirable to use mineral fillers and/or fibrous reinforcing agents in the polymer composition that is used for the polymeric surface in order to ensure that the polymeric material has adequate mechanical properties such as stiffness, heat deflection temperature, and warp resistance. Thus it would be desirable to obtain an apparatus in which an electrically conductive contact is in slidable contact with a polymeric surface in which repeated physical contact of the contact with the surface leads to reduced abrasion of the surface of the electrically conductive contact.

SUMMARY OF THE INVENTION

Disclosed and claimed herein is an apparatus comprising an electrically conductive contact in slidable contact with a polymeric surface comprising a polymeric composition, wherein the polymeric composition comprises
(a) about 30 to about 90 weight percent thermoplastic polymer;
(b) about 5 to about 65 weight percent of at least one mineral filler; and
(c) about 5 to about 50 weight percent of at least one fibrous reinforcing agent wherein the Mohs hardness of the electrically conductive contact is within 1 unit of the Mohs hardness of the mineral filler (b), and wherein the weight percentages are based on the total weight of the composition.

DETAILED DESCRIPTION OF THE INVENTION

Figure 1:
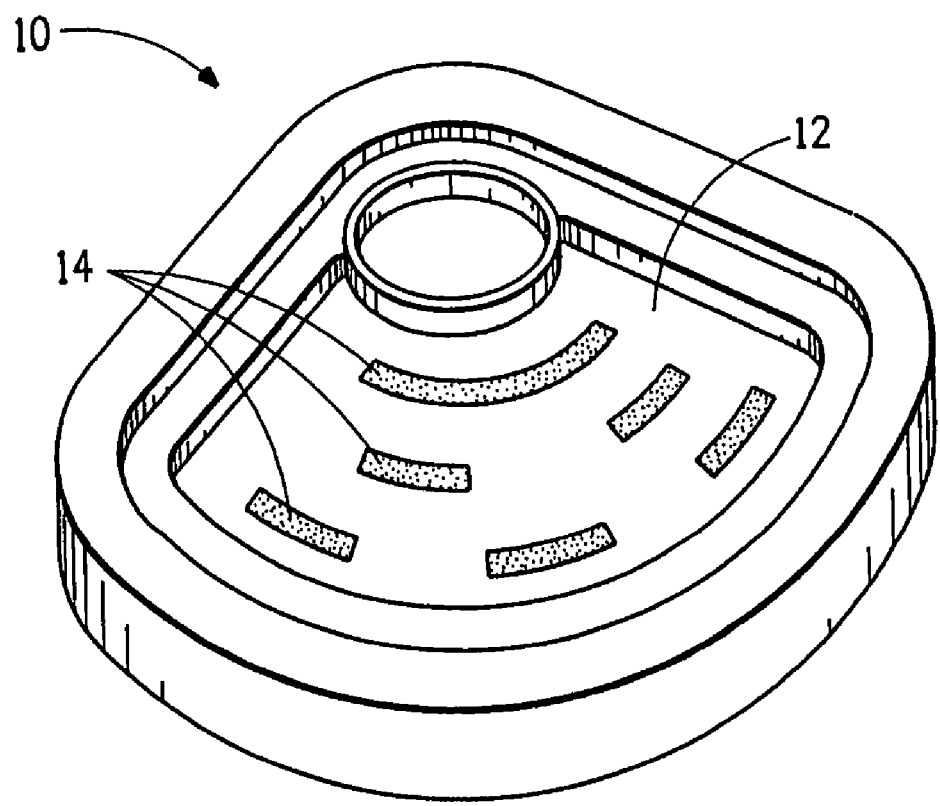
FIG. 1 is a top view of a switch housing comprising a polymer surface.

The apparatus of the present invention comprises an electrically conductive contact that is in slidable contact with a polymeric surface comprising a polymeric composition that comprises a thermoplastic polymer, at least one mineral filler, and at least one fibrous reinforcing agent.

By the term "slidable contact" is meant that during operation of the apparatus, the electrically conductive contact is moved in such a way as to slide across the polymeric surface while in physical contact with the polymeric surface and under a force normal to the polymeric surface.

By the term "electrically conductive contact" is meant an electrically conductive surface that is in physical contact with the polymeric surface. The electrically conductive contact may be connected to an electrical circuit. It may be a metal or a layer of metal plated over or otherwise applied to another surface, such as a surface made from a different metal or a polymeric material. Preferred metals for the metal contact are copper, silver-plated copper, and tin-plated copper. Other useful metals include stainless steel, gold, and silver. The electrically conductive contact may also be made from an electrically conductive non-metallic material such as carbon. The contact may be in the form of a carbon brush.

The polymeric surface may be part of a housing that contains all or part of the apparatus.

In one embodiment of the present invention, the apparatus is an electrical switch assembly. An electrical switch assembly will typically comprise a housing that may be made from one or more components, one or more conductive surfaces (such as metal surfaces) that are connected to an electrical or electronic circuit, a polymeric surface, and one or more electrically conductive contacts that are moved from position to position during operation and are connected to an electrical or electronic circuit. In some positions, an electrically conductive contact may be in physical contact with an electrically conductive surface and in others the same contact may be in physical contact with a surface comprising the polymeric composition used in the present invention. The contacts are moved from position to position by sliding them across the electrically conductive and polymeric surfaces under a force normal to the polymeric surface. The polymeric surface may be part of the housing, or all or part of the housing may be made from other materials, including other polymeric materials. The housing may comprise two or more parts that may be attached to one another by any method known in the art, including welding (such as vibration welding, ultrasonic welding, or laser welding), gluing, fasteners (such as bolts, screws, and the like), etc. The electrically conductive surfaces may be part of a metal lead frame. They may belong to an electrically conductive metal component (such as a lead frame) embedded in the polymeric surface or may belong to metal or other electrically conductive components such as metal strips resting on top of the polymeric surface. The electrically conductive components may be embedded in the polymer surface by any technique known in the art, such as insert molding or overmolding. The electrically conductive components may be attached to the top of the polymeric surface by any technique known in the art, such as using fasteners or the like. Electrically conductive metal components can be added to the polymer by plating.

Figure 2:
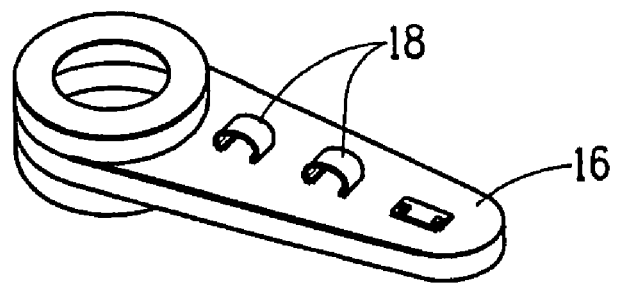
FIG. 2 is view of a wiper arm containing electrically conductive contacts.

An electrical switch assembly apparatus according to the present invention is illustrated in the figures. Having reference to FIG. 1, there is shown generally 10, a switch housing, comprising a polymer surface 12, and a plurality of electrically conductive (preferably metal) surfaces 14 attached to the polymeric surface 12. Having reference to FIG. 2, there is shown generally 16, a wiper arm comprising electrically conductive (preferably metal) contacts 18. Having reference to FIG. 3, there is shown generally an electrical switch assembly 20, comprising switch housing 10 and wiper arm 16. Wiper arm 16 is connected to housing 10 such that the electrically conductive contacts 18 [not shown] are in contact with the assembly 20 such that each electrically conductive contact 18 is in physical contact with polymeric surface 12 or an electrically conductive surface 14. Having reference to FIG. 4, there is shown a cross-sectional view of the electrical switch assembly 20 wherein electrically conductive contacts 30, 32, and 34 are attached to wiper arm 16. Electrically conductive contact 30 is electrically joining and contacting electrically conductive surfaces 36 and 37 while electrically conductive contact 34 is electrically joining and contacting electrically conductive surfaces 39 and 40. Electrically conductive contact 32 is not electrically joining electrically conductive surfaces because it is in contact with polymeric surface 12 and electrically conductive surface 38. Electrically conductive surfaces 36, 37, 38, 39, and 40 belong to a singulated lead frame.

Figure 3:
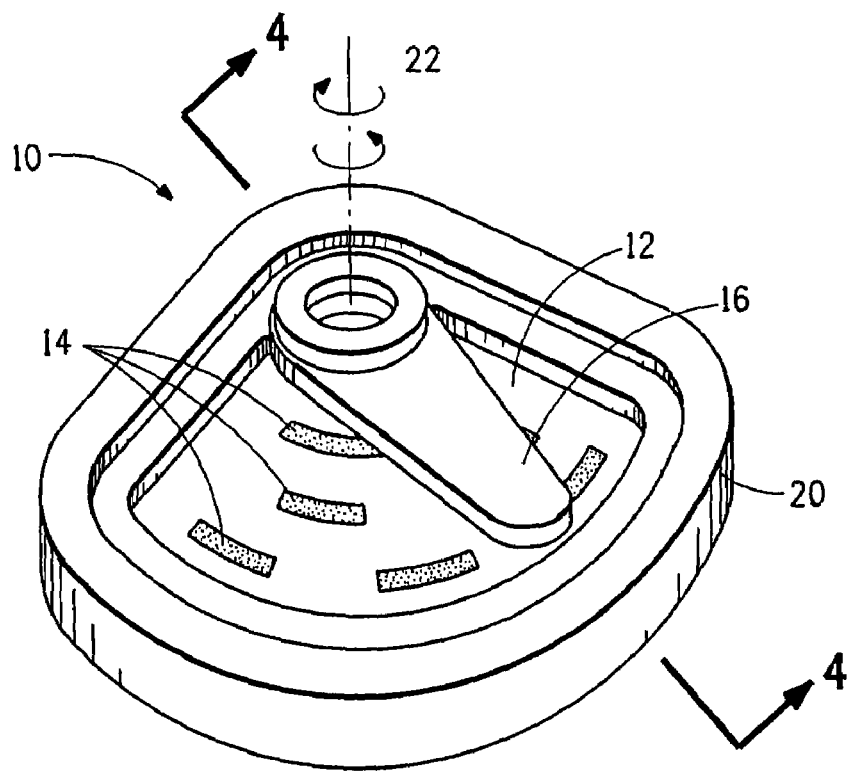
FIG. 3 is a top view of an electrical switch assembly apparatus according to the present invention.
Figure 4:
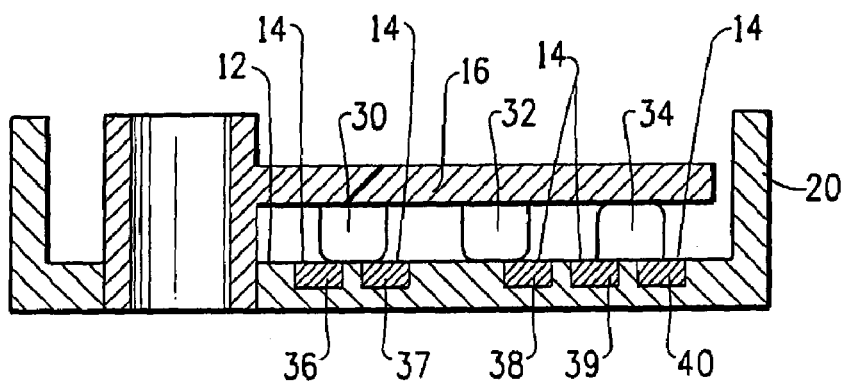
FIG. 4 is a cross-sectional view of an electrical switch assembly apparatus according to the present invention.

Having further reference to FIG. 3, the physical position of wiper arm 16 may be varied by rotating it about axis 22. As its position changes, different combinations of contacts 18 will be in physical contact with electrically conductive surfaces 14 and polymer surface 12. When contacts 18 and electrically conductive surfaces 14 are connected through the wiper arm 16 and lead frame to an electrical or electronic circuit, these different positions correspond to different settings of the switch and may be used to control other devices according to the setting of the switch as electricity is conducted between any electrically conductive surfaces 14 and electrically conductive contacts 18 that are in physical contact in any given switch setting.

When the apparatus of the present invention is a switch assembly, the switch assembly may be used in a vehicle neutral safety switch (also known as a park selection switch or inhibition switch). The switch assembly may also be used in other types of switches, especially those used in automobiles and other vehicles, such as fan speed switches, light switches (such as high beam/low bean switches), windshield wiper speed switches, and the like. The switch is preferably a switch containing an electrically conductive trace and an electrically conductive wiper that wipes across the trace. The switch is particularly suited for applications in which a different circuit is energized at each position.

The apparatus of the present invention may take on myriad other forms, such as a solenoid body where the electrically conductive contact could be in the form of a metal plunger riding on a polymeric surface. The apparatus may be one in which pressed carbon brushes over a copper commutator.

The thermoplastic used in the composition used in the present invention may be any thermoplastic polymer. Blends of two or more thermoplastic polymers may be used. Examples of suitable thermoplastic polymers include, but are not limited to polyesters, polyamides, polyacetals, polycarbonates, polyphenylene oxides, polyphenylene sulfides, polysulphones, polyarylates, polyetheretherketones (PEEK), polyetherketoneketones (PEKK), polyetherimides, and syndiotactic polystyrenes. Preferred are polyamides and polyesters.

Suitable polyamides can be condensation products of dicarboxylic acids and diamines, and/or aminocarboxylic acids, and/or ring-opening polymerization products of cyclic lactams. Suitable dicarboxylic acids include, but are not limited to, adipic acid, azelaic acid, sebacic acid, dodecanedioic acid, isophthalic acid, and terephthalic acid. Suitable diamines include, but are not limited to, tetramethylenediamine, hexamethylenediamine, octamethylenediamine, nonamethylenediamine, dodecamethylenediamine, decamethylenediamine, 2-methylpentamethylenediamine, 2-methyloctamethylenediamine, trimethylhexamethylenediamine, bis(p-aminocyclohexyl)methane, m-xylylenediamine, and p-xylylenediamine. A suitable aminocarboxylic acid is 11-aminododecanoic acid. Suitable cyclic lactams are caprolactam and laurolactam. Preferred polyamides include aliphatic polyamide such as polyamide 6; polyamide 6,6; polyamide 4,6; polyamide 6,10; polyamide 6,12; polyamide 11; polyamide 12; and semi-aromatic polyamides such as poly(m-xylylene adipamide)(polyamide MXD,6), poly (dodecamethylene terephthalamide)(polyamide 12, T), poly (decamethylene terephthalamide)(polyamide 10, T), poly (nonamethylene terephthalamide)(polyamide 9, T), hexamethylene adipamide/hexamethylene terephthalamide copolyamide(polyamide 6, T/6,6), hexamethylene terephthalamide/2-methylpentamethylene terephthalamide copolyamide(polyamide 6, T/D,T); and copolymers and mixtures of these polymers. The polyamides may be amorphous or semicrystalline.

Preferred polyesters include polyesters having an inherent viscosity of 0.3 or greater and that are, in general, linear saturated condensation products of diols and dicarboxylic acids, or reactive derivatives thereof. Preferably, they will comprise condensation products of aromatic dicarboxylic acids having 8 to 14 carbon atoms and at least one diol selected from the group consisting of neopentyl glycol, cyclohexanedimethanol, 2,2-dimethyl-1,3-propane diol and aliphatic glycols of the formula $HO(CH_2)_nOH$ where n is an integer of 2 to 10. Up to 20 mole percent of the diol may be an aromatic diol such as ethoxylated bisphenol A, sold under the tradename Dianol 220 by Akzo Nobel Chemicals, Inc.; hydroquinone; biphenol; or bisphenol A. Up to 50 mole percent of the aromatic dicarboxylic acids can be replaced by at least one different aromatic dicarboxylic acid having from 8 to 14 carbon atoms, and/or up to 20 mole percent can be replaced by an aliphatic dicarboxylic acid having from 2 to 12 carbon atoms. Copolymers may be prepared from two or more diols or reactive equivalents thereof and at least one dicarboxylic acid or reactive equivalent thereof or two or more dicarboxylic acids or reactive equivalents thereof and at least one diol or reactive equivalent thereof. Difunctional hydroxy acid monomers such as hydroxybenzoic acid or hydroxynaphthoic acid may also be used.

Preferred polyesters include poly(ethylene terephthalate) (PET), poly(1,4-butylene terephthalate) (PBT), poly(propylene terephthalate) (PPT), poly(1,4-butylene naphthalate) (PBN), poly(ethylene naphthalate) (PEN), poly(1,4-cyclohexylene dimethylene terephthalate) (PCT), and copolymers and mixtures of the foregoing. Also preferred are 1,4-cyclohexylene dimethylene terephthalate/isophthalate copolymer and other linear homopolymer esters derived from aromatic dicarboxylic acids, including isophthalic acid; bibenzoic acid; naphthalenedicarboxylic acids including the 1,5-, 2,6-, and 2,7-naphthalenedicarboxylic acids; 4,4'-diphenylenedicarboxylic acid; bis(p-carboxyphenyl) methane; ethylene-bis-p-benzoic acid; 1,4-tetramethylene bis(p-oxybenzoic) acid; ethylene bis(p-oxybenzoic) acid; 1,3-trimethylene bis(p-oxybenzoic) acid; and 1,4-tetramethylene bis(p-oxybenzoic) acid, and glycols selected from the group consisting of 2,2-dimethyl-1,3-propane diol; neopentyl glycol; cyclohexane dimethanol; and aliphatic glycols of the general formula $HO(CH_2)_nOH$ where n is an integer from 2 to 10, e.g., ethylene glycol; 1,3-trimethylene glycol; 1,4-tetramethylene glycol;-1,6-hexamethylene glycol; 1,8-octamethylene glycol; 1,10-decamethylene glycol; 1,3-propylene glycol; and 1,4-butylene glycol. Up to 20 mole percent, as indicated above, of repeat units derived from one or more aliphatic acids, including adipic, sebacic, azelaic, dodecanedioic acid, or 1,4-cyclohexanedicarboxylic acid can be present. Also preferred are copolymers derived from 1,4-butanediol, ethoxylated bisphenol A, and terephthalic acid or reactive equivalents thereof. Also preferred are random copolymers of at least two of PET, PBT, and PPT, and mixtures of at least two of PET, PBT, and PPT, and mixtures of any of the foregoing.

The polyester may also be in the form of copolymers that contain poly(alkylene oxide) soft segments. The poly(alkylene oxide) segments are preferably present in about 1 to about 15 parts by weight per 100 parts per weight of polyester. The poly(alkylene oxide) segments preferably have a number average molecular weight in the range of about 200 to about 3,250 or, more preferably, in the range of about 600 to about 1,500. Preferred copolymers contain poly(ethylene oxide) incorporated into a PET or PBT chain. Methods of incorporation are known to those skilled in the art and can include using the poly(alkylene oxide) soft segment as a comonomer during the polymerization reaction to form the polyester. PET may be blended with copolymers of PBT and at least one poly(alkylene oxide). A poly(alkylene oxide) may also be blended with a PET/PBT copolymer. The inclusion of a poly(alkylene oxide) soft segment into the polyester portion of the composition may accelerate the rate of crystallization of the polyester.

The compositions used in the present invention comprise about 30 to about 90 weight percent, or preferably about 40 to about 80 weight percent, or more preferably about 45 to about 75 weight percent thermoplastic polymer, wherein the weight percentages are based on the total weight of the composition.

The compositions of the present invention comprise about 5 to about 65 weight percent, or more preferably about 10 to about 40 weight percent, or yet more preferably about 15 to about 30 weight percent of at least one mineral filler, based on the total weight of the composition.

The mineral filler is at least one non-fibrous or non-needle-like filler and may have a form that is flaky, platy, granular, spheroidal, cubic, tubular, denditric, elongated, irregular, or the like.

The material of the electrically conductive contact is selected such that it has a Mohs hardness that is within about 1 units of the Mohs hardness of at least about 75 weight percent, or preferably of at least about 90 weight percent, or yet more preferably of at least about 95 weight percent or still more preferably of at least about 99 weight percent or even more preferably of at least 100 weight percent of the amount of mineral filler present in the composition (meaning that it is between about 1 units less than the Mohs hardness of the mineral filler and about 1 units more than the Mohs hardness of each mineral filler). Preferably, the material of the electrically conductive contact is selected such that it has a Mohs hardness that is within 0.5 units of the Mohs hardness of at least about 75 weight percent, or of preferably at least about 90 weight percent, or yet more preferably of at least 95 weight percent or still more preferably of at least about 99 weight percent or even more preferably of at least 100 weight percent of the amount of mineral filler present in the composition. It is preferred that the material of the electrically conductive contact and the mineral filler be selected such that the electrically conductive contact material has a Mohs hardness of about 2.5 to about 4 and that each mineral filler have a Mohs hardness of about 2.5 to about 4.

For example, when the material of the electrically conductive contact is copper or silver-plated copper, which have a Mohs hardness of about 2.5-3, suitable mineral fillers may include forms of calcium carbonate (Mohs hardness of about 3), mica (Mohs hardness of about 3), montmorillonite (Mohs hardness of about 2-3), and gypsum (Mohs hardness of about 2.3-3).

The mineral filler is present in about 5 to about 65 weight percent, or more preferably about 10 to about 40 weight percent, or yet more preferably about 15 to about 30 weight percent, based on the total weight of the composition.

The fibrous reinforcing agent is at least one fibrous or needlelike material having an aspect ratio of greater than or equal to about 3. Examples of suitable reinforcing agents include glass fibers, carbon fibers, wollastonite, aramids, and the like. The amount of reinforcing agent used is preferably about 5 to about 50 weight percent, or more preferably about 10 to about 40 weight percent, or yet more preferably about 15 to about 30 weight percent, based on the total weight of the composition.

The composition may contain optional additional components such as, but not limited to one or more of impact modifiers, plasticizers, thermal stabilizers, oxidative stabilizers, UV light stabilizers, flame retardants, chemical stabilizers, lubricants, mold-release agents, colorants (such as carbon black and other dyes and pigments), nucleating agents, nanoclays, flow enhancers, and the like.

The compositions used in the present invention are melt-mixed blends. Melt-blending may be carried out using any appropriate method known to those skilled in the art. Suitable methods may include using a single or twin-screw extruder, blender, kneader, Banbury mixer, molding machine, etc. Twin-screw extrusion is preferred. The compositions may be in the form of a wide variety of articles, including housings, made by any appropriate melt-processing technique, including injection molding, rotomolding and other melt-processing techniques.

In one embodiment of the present invention, when the thermoplastic polymer is a condensation polymer such as a polyamide or polyester, the composition may optionally be made by melt-blending the thermoplastic polymer, reinforcing agent, mineral filler, and optional additional components with at least one flow enhancer in the form of a dicarboxylic acid, tricarboxylic acid, dicarboxylic acid anhydride, and/or tricarboxylic acid anhydride. These are referred to herein hereafter as the "carboxylic acid and/or anhydride." Alternatively, previously melt-blended mixtures of polymer with one or more of the desired components may be melt-blended with the carboxylic acid and/or anhydride and any necessary or desired additional components.

The carboxylic acid and/or anhydride is preferably an aromatic carboxylic acid and/or anhydride that has a melting point that is no greater than the onset temperature of the melting point endotherm of the condensation polymer. The carboxylic acid and/or anhydride may also be an aliphatic alicyclic carboxylic acid and/or anhydride, such adipic acid, sebacic acid, dodecanedioic acid, and the like.

As used herein in reference to the carboxylic acid and/or anhydride, the term "melting point" refers to sublimation point or decomposition point if the organic acid does not have a melting point. Examples of suitable aromatic dicarboxylic acids and/or aromatic dicarboxylic acid anhydrides include phthalic acid, phthalic anhydride, and trimelitic anhydride.

By "onset temperature of the melting point endotherm" of the thermoplastic condensation polymer is meant the extrapolated onset temperature of the melting curve of the polyamide or polyester ($T_f$) as measured by differential scanning calorimetry (DSC) following ASTM method D3418—82 (Reapproved 1988). If the condensation polymer has two or more melting point endotherms, the onset temperature of the lowest melting point endotherm is selected. If two or more polymers are used, the onset temperature of the melting point endotherm of the polymer with the lowest melting point endotherm onset temperature is chosen.

The carboxylic acid and/or anhydride is used at about 0.01 to about 10 weight percent, or preferably at about 0.05 to about 2 weight percent, or more preferably at about 0.1 to about 1 weight percent, where the weight percentages are based on the total weight of condensation polymer.

EXAMPLES

The following polymer resins compositions were used in the examples and comparative examples. All polymer resins were supplied by E.I. du Pont de Neumours & Co., Wilmington, Del.

Example 1

Minlon® IG39 BK434: polyamide 6,6 containing 13 weight percent glass fibers and 25 weight percent calcium carbonate and black colorant.
Comp. Ex. 1: Minlon® IG38C1 BK434: polyamide 6,6 containing 10 weight percent glass fibers and 28 weight percent kaolin and black pigment.
Comp. Ex. 2: Minlon® FE6228 BK192Y: polyamide 6 containing 17 weight percent glass fibers and 20 weight percent wollastonite and black pigment.
Comp. Ex. 3: Minlon® IG40D2 BK434: polyamide 6,6 containing 13 weight percent glass fibers and 25 weight percent talc and black pigment.
Comp. Ex. 4: Minlon® FE6190 BK086: polyamide 6,6 containing 16.5 weight percent glass fibers and 19.6 weight percent wollastonite and black pigment.
Comp. Ex. 5: Minlon® 11C40 NC010: polyamide (comprising a melt-mixed blend of 3:1 by weight of polyamide 6,6 and polyamide 6) containing 40 weight percent kaolin.
Comp. Ex. 6: Zytel® 70G33L NC 010: polyamide 6,6 containing 33 weight percent glass fibers.
Comp. Ex. 7: Zytel® 72G33L NC 010: nylon copolymer 66/6 containing 33 weight percent glass fibers.
Comp. Ex. 8: A cube blend of 45 weight percent (A), 36 weight percent (B), and 19 weight percent (C). (A) is Zytel® 77G33L: polyamide 6,12 containing 33 weight percent glass fibers. (B) is Minlon® IG38C1 BK434: polyamide 6,6 containing 10 weight percent glass fibers and 28 weight percent kaolin and black pigment. (C) is Zytel® 101L NCO10: polyamide 6,6.
Comp. Ex. 9: A cube blend of 45 weight percent (A), 40 weight percent (B), and 15 weight percent (C). (A) is Zytel® 77G33L: polyamide 6,12 containing 33 weight percent glass fibers. (B) is Minlon® IG40D2 BK434: polyamide 6,6 containing 13 weight percent glass fibers and 25 weight percent talc and black pigment. (C) is Zytel® 101L NCO10: polyamide 6,6.
Comp. Ex. 10: A cube blend of 50 weight percent (A) and 50 weight percent (B). (A) is Zytel® 70GB30: polyamide 6,6 containing 30 weight percent glass beads. (B) is Zytel® 70G33L NC 010: polyamide 6,6 containing 33 weight percent glass fibers.

Test Methods

Heat deflection temperature (HDT) was determined at 1.8 MPa using ISO method 75. The results are given in Table 1.

Wear testing run on an ASTM D3702 thrust washer machine. The polymer resin compositions of each example and comparative example were molded into moving test samples having a 0.2 in² surface area that were slightly modified from those specified in the ASTM method. The testing was run at 0.13 feet per second and 213 psi (27.7 PV) in unidirectional rotation. The testing was run against a stationary ring counter surface of silver-plated copper. The duration of testing was 100 minutes. Testing was done at 23° C. and 50% relative humidity and the samples were dry-as-molded at the initiation of testing. Three samples for each composition were tested and the results were averaged. The average weight loss is reported in Table 1.

TABLE 1

| | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Glass fibers | 13 | 10 | 17 | 13 | 16.5 | — | 33 | 33 | 18.5 | 20 | 16.5 |
| Calcium carbonate | 25 | — | — | — | — | — | — | — | — | — | — |
| Kaolin | — | 28 | — | — | — | 40 | — | — | 10 | — | — |
| Wollastonite | — | — | 20 | — | 19.6 | — | — | — | — | — | — |
| Talc | — | — | — | 25 | — | — | — | — | — | 10 | — |
| Glass beads | — | — | — | — | — | — | — | — | — | — | 15 |
| Mohs hardness of mineral filler(s) | 3 | 4-8 | 4.5 | 1 | 4.5 | 4-8 | 6-6.5 | 6-6.5 | 6-6.5 and 4-8 | 6-6.5 and 1 | 6-6.5 |
| Average weight loss from wear testing (mg) | 0.6 | 1.6 | 2.1 | 6.5 | 2.1 | 0.7 | 1.8 | 2.3 | 1.2 | 4.4 | 2.9 |
| Total amount of mineral filler and fibrous reinforcing agent (weight percent in the resin composition) | 38 | 38 | 37 | 38 | 36.1 | 40 | 33 | 33 | 28.5 | 30 | 31.5 |
| HDT (° C.) | 239 | 235 | 202 | 243 | 237 | 99 | 251 | 221 | — | — | — |

Filler and fibrous reinforcing agent quantities are given in weight percent relative to the total weight of the composition.

What is claimed is:

1. An apparatus comprising an electrically conductive contact in slidable contact with a polymeric surface comprising a polymeric composition, wherein the polymeric composition comprises
   (a) about 30 to about 90 weight percent thermoplastic polymer;
   (b) about 5 to about 65 weight percent of at least one mineral filler; and
   (c) about 5 to about 50 weight percent of at least one fibrous reinforcing agent wherein the Mohs hardness of the electrically conductive contact is within 1 unit of the Mohs hardness of the mineral filler (b), and wherein the weight percentages are based on the total weight of the composition.

2. The apparatus of claim 1, the Mohs hardness of the electrically conductive contact is within 0.5 units of the Mohs hardness of the mineral filler (b).

3. The apparatus of claim 1, wherein the thermoplastic polymer is selected from one or more of polyesters, polyamides, polyacetals, polycarbonates, polyphenylene oxides, polyphenylene sulfides, polysulphones, polyarylates, polyetheretherketones, polyetherketoneketones, and syndiotactic polystyrenes.

4. The apparatus of claim 3, wherein the thermoplastic polymer is one or more polyester and/or one or more polyamide.

5. The apparatus of claim 4, wherein the polyester is selected from one or more of the group consisting of poly(ethylene terephthalate), poly(1,4-butylene terephthalate), poly(propylene terephthalate), poly(1,4-butylene naphthalate), poly(ethylene naphthalate), and poly(1,4-cyclohexylene dimethylene terephthalate).

6. The apparatus of claim 4, wherein the polyamide is selected from one or more of the groups consisting of polyamide 6; polyamide 6,6; polyamide 4,6; polyamide 6,10; polyamide 6,12; polyamide 11; polyamide 12; poly(m-xylylene adipamide); poly(dodecamethylene terephthalamide); poly(decamethylene terephthalamide); poly(nonamethylene terephthalamide); hexamethylene adipamide/hexamethylene terephthalamide copolyamide; and hexamethylene terephthalamide/2-methylpentamethylene terephthalamide copolyamide.

7. The apparatus of claim 4, wherein the polymer composition is prepared by melt-blending a mixture comprising the one or more polyamide and/or one or more polyester with mineral filler (b), and at least one aromatic dicarboxylic acid, aromatic dicarboxylic acid anhydride, aromatic tricarboxylic acid, and/or aromatic tricarboxylic acid anhydride.

8. The apparatus of claim 1, wherein the reinforcing agent is one or more of glass fibers, carbon fibers, wollastonite, and aramids.

9. The apparatus of claim 7, wherein the reinforcing agent is glass fibers.

10. The apparatus of claim 1, wherein the electrically conductive contact is metal.

11. The apparatus of claim 10, wherein the metal contact is copper or silver-plated copper and the mineral filler is one or more of calcium carbonate, mica, and gypsum.

12. The apparatus of claim 11, wherein the mineral filler is calcium carbonate.

13. The apparatus of claim 1 in the form of a electrical switch assembly.

14. The electrical switch assembly of claim 13 in the form of a vehicle neutral safety switch.

15. The apparatus of claim 1 in the form of a solenoid body.

* * * * *